US011450297B1

(12) United States Patent
Sprague et al.

(10) Patent No.: US 11,450,297 B1
(45) Date of Patent: Sep. 20, 2022

(54) ELECTRONIC DEVICE WITH CENTRAL AND PERIPHERAL DISPLAYS

(71) Applicant: Apple Inc., Cupertino, CA (US)

(72) Inventors: William W. Sprague, Berkeley, CA (US); David W. Lum, Cupertino, CA (US); Pretesh A. Mascarenhas, Santa Clara, CA (US); Shubham A. Gandhi, Milpitas, CA (US); Tyler B. Milhem, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 16/503,328

(22) Filed: Jul. 3, 2019

Related U.S. Application Data

(60) Provisional application No. 62/725,141, filed on Aug. 30, 2018.

(51) Int. Cl.
*G09G 5/37* (2006.01)
*G09G 5/14* (2006.01)
*G09G 5/02* (2006.01)
*G06T 3/00* (2006.01)
*G02B 7/02* (2021.01)
*G09G 3/32* (2016.01)

(52) U.S. Cl.
CPC ............... *G09G 5/37* (2013.01); *G02B 7/021* (2013.01); *G06T 3/0093* (2013.01); *G09G 3/32* (2013.01); *G09G 5/02* (2013.01); *G09G 5/14* (2013.01); *G09G 2320/0666* (2013.01); *G09G 2330/027* (2013.01); *G09G 2340/0464* (2013.01); *G09G 2354/00* (2013.01)

(58) Field of Classification Search
CPC .. G09G 5/37; G09G 5/02; G09G 5/14; G09G 3/32; G02B 7/021; G06T 3/0093
USPC ....................................................... 345/418
See application file for complete search history.

(56) References Cited

U.S. PATENT DOCUMENTS

| | | | | |
|---|---|---|---|---|
| 9,454,010 B1* | 9/2016 | Passmore | ............ | G02B 3/0087 |
| 10,183,231 B1* | 1/2019 | Lowe | ............ | A63H 33/22 |
| 10,481,687 B1* | 11/2019 | Trail | ............ | G06F 3/011 |
| 10,606,082 B2* | 3/2020 | Petersen | ............ | G02B 27/0179 |
| 10,845,595 B1* | 11/2020 | Sohn | ............ | G02B 27/0172 |
| 10,871,823 B1* | 12/2020 | Burgess | ............ | G06F 3/011 |
| 10,948,801 B1* | 3/2021 | Lu | ............ | G02C 7/083 |

(Continued)

*Primary Examiner* — Prabodh M Dharia
(74) *Attorney, Agent, or Firm* — Treyz Law Group, P.C.; G. Victor Treyz; Tianyi He

(57) ABSTRACT

An electronic device such as a head-mounted device may have a display that is viewable by a user from eye boxes. The electronic device may have a gaze tracking system that monitors a user's eyes in the eye boxes to gather gaze direction information. The display may have a central portion and a peripheral portion. The peripheral portion may have a lower resolution than the central portion and may be used in displaying content that is viewable in a user's peripheral vision. During operation, control circuitry in the electronic device may adjust peripheral content on the peripheral portion to correct for parallax-induced mismatch between the peripheral content and central content on the central portion of the display. The control circuitry may also depower peripheral pixels that are determined to be unviewable based on the gaze direction. Diffusers may be used to hide seams between the central and peripheral display portions.

23 Claims, 10 Drawing Sheets

(56) References Cited

U.S. PATENT DOCUMENTS

| | | | |
|---|---|---|---|
| 2011/0202286 A1* | 8/2011 | De Rossi | G02C 7/028 |
| | | | 702/19 |
| 2012/0281183 A1* | 11/2012 | Mousset | G02C 7/024 |
| | | | 351/159.77 |
| 2012/0287405 A1* | 11/2012 | Mousset | G02C 7/027 |
| | | | 351/246 |
| 2013/0214998 A1 | 8/2013 | Andes et al. | |
| 2014/0146394 A1 | 5/2014 | Tout et al. | |
| 2015/0219900 A1* | 8/2015 | Rhodes | G02B 27/0176 |
| | | | 345/8 |
| 2016/0282617 A1* | 9/2016 | Asai | B60K 35/00 |
| 2017/0115489 A1 | 4/2017 | Hu et al. | |
| 2018/0003981 A1 | 1/2018 | Urey | |
| 2018/0096471 A1 | 4/2018 | Wilson | |
| 2018/0136471 A1* | 5/2018 | Miller | G02B 27/0093 |
| 2019/0027534 A1* | 1/2019 | Rotzoll | H01L 25/0753 |
| 2019/0355292 A1* | 11/2019 | Morin | G09G 3/3611 |
| 2020/0004020 A1* | 1/2020 | Bhakta | G02B 27/30 |
| 2020/0033560 A1* | 1/2020 | Weber | G06K 7/12 |
| 2021/0096363 A1* | 4/2021 | Lee | G02B 27/0101 |
| 2021/0096726 A1* | 4/2021 | Faulkner | G06F 3/04883 |

\* cited by examiner

ELECTRONIC DEVICE WITH CENTRAL AND PERIPHERAL DISPLAYS

This application claims the benefit of provisional patent application No. 62/725,141, filed Aug. 30, 2018, which is hereby incorporated by reference herein in its entirety.

FIELD

This relates to electronic devices, and, more particularly, to head-mounted devices.

BACKGROUND

Head-mounted devices such as virtual reality headsets can be used to provide virtual reality content to a user. The virtual reality content may contain computer-generated content for games and other moving images.

Challenges can arise in presenting virtual reality content to a user. If care is not taken, the display structures that are used in presenting the content will not cover the user's peripheral vision, which will detract from the immersive nature of the user's virtual reality experience.

SUMMARY

An electronic device such as a head-mounted device may have a display. The display may be coupled to head-mounted support structures. Lenses may be aligned with eye boxes. When a user's eyes are located in the eye boxes, content on a central portion of the display may be viewed through the lenses. Peripheral content on peripheral portions of the display may be viewed from the eye boxes without the lenses. The peripheral portion may have a lower resolution than the central portion and may be used in displaying content that is viewable in a user's peripheral vision.

The electronic device may have a gaze tracking system that monitors a user's eyes in the eye boxes to gather information on the gaze direction of the user's eyes. During operation, control circuitry in the electronic device may use the gaze direction information to adjust peripheral content on the peripheral portion to correct for parallax-induced mismatch between the peripheral content and central content on the central portion of the display. The control circuitry may also depower peripheral pixels that are determined to be unviewable based on the gaze direction information.

Diffuser structures may be used to help hide the boundary between the central and peripheral display portions. The diffuser structures may be formed from lens holder structures that support the lenses or a separate diffuser layer. A neutral density filter may be used to reduce pixel brightness in the peripheral display portion. Pulse width modulation schemes may also be used to regulate pixel intensity.

The peripheral content may be derived from edge portions of the central content or may be independently provided content. Peripheral pixels may be formed on a flexible substrate or other mounting structure. In some configurations, the peripheral pixels may be formed on a surface with a curved profile such as a surface with compound curvature.

DETAILED DESCRIPTION

A head-mounted device may be provided with a display. The head-mounted device may be used in displaying virtual reality content for a user. To enhance user immersion in the content that is being presented, the display may have a peripheral portion that covers the user's peripheral vision. The peripheral display portion may use individual light-emitting diodes or other pixels that have a lower density and that display content at a lower resolution than the central portion of the display. Because the user's visual acuity is reduced in the periphery of the user's visual field, the reduction in the resolution of the peripheral display portion relative to the central portion will not be noticeable to the user. The presence of content in the peripheral display will help cover all portions of a user's vision and will therefore enhance the immersive effect of the head-mounted device when the head-mounted device is being used to present virtual reality content to the user.

Figure 1:
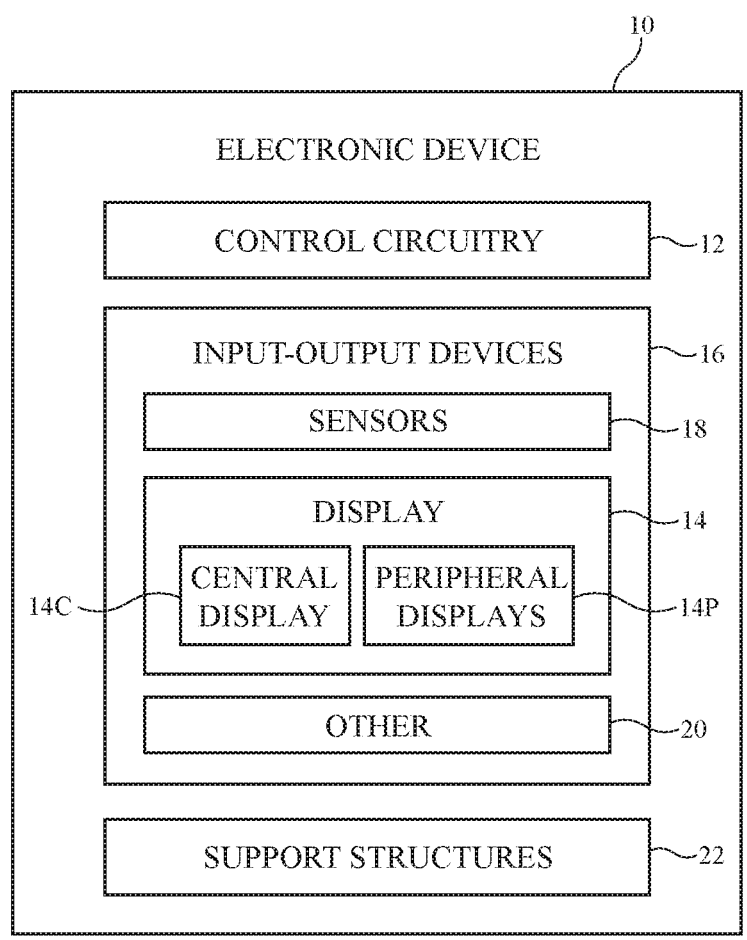
FIG. 1 is a schematic diagram of an illustrative head-mounted device in accordance with an embodiment.

A schematic diagram of an illustrative head-mounted device with a peripheral display is shown in FIG. 1. As shown in FIG. 1, head-mounted device 10 may include head-mounted support structures 22. Support structures 22 may form glasses, goggles, a helmet, hat, or other wearable structures that are configured to be mounted (worn) on the head of a user while supporting the components of device 10. Support structures 22 may support lenses, display components, and other portions of device 10.

Device 10 may include control circuitry 12 and input-output devices 16. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control display components and other output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment (e.g., equipment a computer, cellular telephone, or other host device, etc.), control circuitry 12 may include communications circuitry. The communications circuitry of control circuitry 12 may include antennas, radio-frequency transceiver circuitry, and other wireless communications circuitry and/or wired communications circuitry. Circuitry 12, which may sometimes be referred to as control and communications circuitry, may, for example, support wireless communications using wireless local area network links, near-field communications links, cellular telephone links, millimeter wave links, and/or other wireless communications paths.

Input-output devices 16 may be used in gathering user input, in gathering information on the environment surrounding the user, and/or in providing a user with output. Devices 16 may include sensors 18. Sensors 18 may include image sensors, force sensors (e.g., strain gauges, capacitive force sensors, resistive force sensors, etc.), audio sensors such as microphones, touch sensors, proximity sensors, optical sensors that emit and detect light, ultrasonic sensors, monochromatic and color ambient light sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors (e.g., radar and other ranging and positioning sensors), depth sensors (e.g., structured light sensors and/or depth sensors based on stereo imaging devices), optical sensors such as self-mixing sensors and light detection and ranging (lidar) sensors that gather time-of-flight measurements and/or other measurements to determine distance and/or relative velocity, humidity sensors, moisture sensors, and/or other sensors.

Sensors 18 may include one or more sensors for monitoring a user's direction of gaze. Sensors 18 may, for example, include one or more gaze tracking sensors (sometimes referred to as gaze trackers or gaze tracking systems). A gaze tracking sensor may, for example, emit one or more beams of light towards a user's eyes and use an image sensor and/or other light-sensing device to measure light reflections and eye images to track the orientation of the user's eyes. Gaze direction information may be gathered in real time during operation of device 10 and used in adjusting the content that is displayed for the user.

Input-output devices 16 may also include displays such as display 14. Display 14 may include a central portion such as central display 14C and peripheral portions on the left and right of display 14C such as peripheral portions 14P. In central portion 14C, each eye of a user may have a corresponding separate display panel or a single display panel may be used to provide content to both of a user's eyes. Displays 14C and 14P may be organic light-emitting diode displays, displays based on arrays of light-emitting diodes formed from crystalline semiconductor dies, liquid crystal displays, electrophoretic displays, microelectromechanical systems (MEMs) displays such as displays with arrays of moving mirrors, displays formed from crystalline semiconductor light-emitting diode dies (e.g., microLEDs), and/or other displays. With one illustrative arrangement, the central portion of display 14 may be formed using a liquid crystal display or organic light-emitting diode display and the peripheral portion (portions) of display 14 may be formed using a lower resolution array of discrete light-emitting diodes. Other configurations may be used for display 14, if desired.

In addition to display 14, input-output devices 16 may include other devices 20. Devices 20 may include components such as status indicator lights (e.g., light-emitting diodes in devices 10 that serves as power indicators, and other light-based output devices), speakers and other audio output devices, batteries, etc. Devices 20 may also include power transmitting and/or receiving circuits configured to transmit and/or receive wired and/or wireless power signals. Devices 20 may include buttons, rotating buttons, push buttons, joysticks, keys such as alphanumeric keys in a keyboard or keypad, microphones for gathering voice commands, touch sensor input devices, touch sensor buttons, touch sensor slider buttons, track pads, and/or other devices for gathering user input for controlling the operation of device 10. Devices 20 may also include output components such as haptic output devices and other output components.

Figure 2:
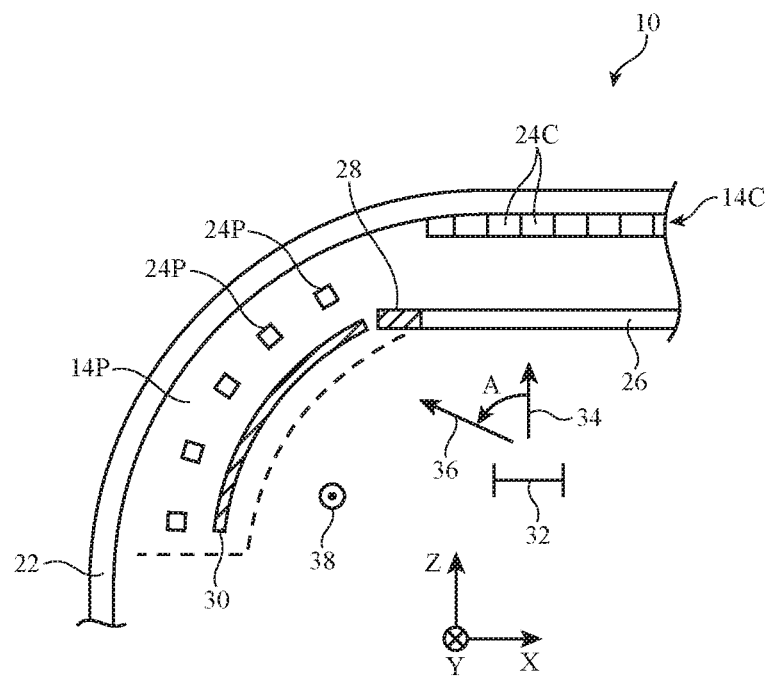
FIG. 2 is a top view of a portion of an illustrative head-mounted device in accordance with an embodiment.

FIG. 2 is a cross-sectional top view of an illustrative left portion of a head-mounted device. The right portion of head-mounted device 10 may have the same layout. As shown in FIG. 2, head-mounted device 10 may include a central display such as central display 14C that is used in presenting high resolution images to a user when the user's eyes are located in eye boxes such as eye box 32. Central display 14C and the other components of FIG. 2 may be mounted to head-mounted support structures 22. A pair of lenses such as lens 26 (e.g., left and right lenses for the user's left and right eyes) may be respectively aligned with left and right eye boxes 32 and used to help the user focus on display 14C. Display 14C may be planar or may be curved. Lenses 26 may be Fresnel lenses or other suitable lenses. Lens holders 28 may be used to couple lenses 26 to support structures 22. Each lens holder 28 may, for example, have a ring shape that surrounds the periphery or a respective one of lenses 26.

Peripheral display 14P may be located in the user's peripheral vision to the left and right of central display 14C. For example, the user may view main display 14C in direction 34 (e.g., a direction that is parallel to the surface normal of display 14C and that is straight ahead of the user) and may view peripheral display 14P in directions such as direction 36 that are oriented off to the side at a non-zero angle A with respect to direction 34. The value of A may be for example, at least 40°, at least 45°, at least 60°, less than 100°, less than 90°, or other suitable value.

Central display 14C may have central pixels 24C (e.g., an array of central pixels). Pixels 24C may display images with a relatively high resolution (e.g., at least 50 pixels per inch, at least 100 pixels per inch, at least 200 pixels per inch, at least 400 pixels per inch, fewer than 1000 pixels per inch, etc.). Peripheral display 14P may have peripheral pixels 24P (e.g., an array of peripheral pixels) that are arranged to have a lower density (pixels per unit area) and therefore a lower resolution than pixels 24C. Pixels 24P may, for example, have a resolution of 12-25 pixels per inch, at least 5 pixels per inch, at least 10 pixels per inch, at least 15 pixels per inch, at least 20 pixels per inch, fewer than 50 pixels per inch, fewer than 30 pixels per inch, or other suitable resolution. Peripheral display 14P may have a left portion on the left-hand side of central portion 14C (sometimes referred to as the left peripheral display of device 10) and a right portion on the right-hand side of central portion 14C (sometimes referred to as the right peripheral display of device 10). By using a lower pixel density for the left and right peripheral portions of display 14 relative to the main central portion of display, power consumption and the amount of image processing that is required to display content for the user can be reduced.

Pixels 24P may be formed using any suitable type of pixel structure (e.g., light-emitting diodes formed from thin-film diodes such as organic light-emitting diodes, light-emitting diodes formed from crystalline semiconductor dies, etc.). Pixels 24C may be formed as part of a display panel such as an organic light-emitting diode display panel, a liquid crystal display panel, a display based on a digital micromirror device, a liquid-crystal-on-silicon display, or other suitable display technology. In arrangements in which the brightness of light-emitting diodes in pixels 24P is relatively high, an optional neutral density filter such as filter 30 of FIG. 2 may be interposed between peripheral display 14P and eye box 32 to help dim display 14P to a comfortable level. Light-emitting diodes in pixels 24P may also be dimmed using pulse-width modulation of the drive currents applied to pixels 24P.

To reduce the overall size and weight of device 10 on a user's head, head-mounted support structures 22 may include lightweight materials such as polymers. Other materials (e.g., metal, glass, etc.) may also be used in forming head-mounted support structures 22. Head-mounted support structures 22 may have a shape that conforms to the generally spherical shape of a human head. For example, when viewed from above as shown in FIG. 2, peripheral display 14P (and, if desired, some or all of central display 14C) may have a curved profile that follows the curved outline of a user's head. Pixels 24P may, for example, be formed on a surface that bends about vertical bend axis 38. This surface may form part of a cylindrical surface or other curved surface. If desired, pixels 24P may lie on a surface that bends about an axis in the X-Z plane (see, e.g., pixels 24P of peripheral display 14P of FIG. 3, which are shown as curving about axis 40, which lies in the X-Z plane). Axis 40 may run parallel to the Y axis or other axis in the X-Z plane (in this example). Moreover, pixels 24P may, if desired, lie on a surface of compound curvature (e.g., so that pixels 24P in display portion 14P are relatively equidistant from a user's eyes).

Figure 3:
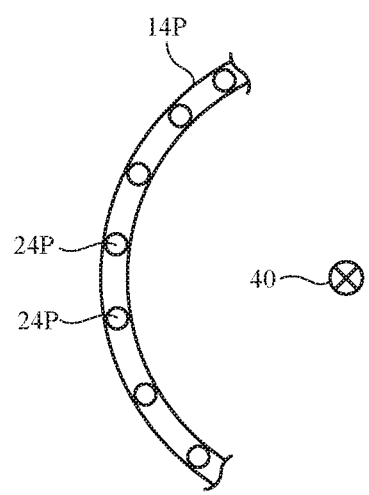
FIG. 3 is a cross-sectional side view of a portion of an illustrative peripheral display in accordance with an embodiment.

In general, display portion 14P may have any suitable shape (a shape curving about a vertical axis such as axis 38 of FIG. 2, a shape curving around a horizontal axis such as axis 40 of FIG. 3, a shape having parts with curvature in multiple directions, a shape having planar sections that approximate a curved shape, other three-dimensional shapes, etc.). The shapes of peripheral display 14P that are shown in FIGS. 2 and 3 are illustrative.

Figure 4:
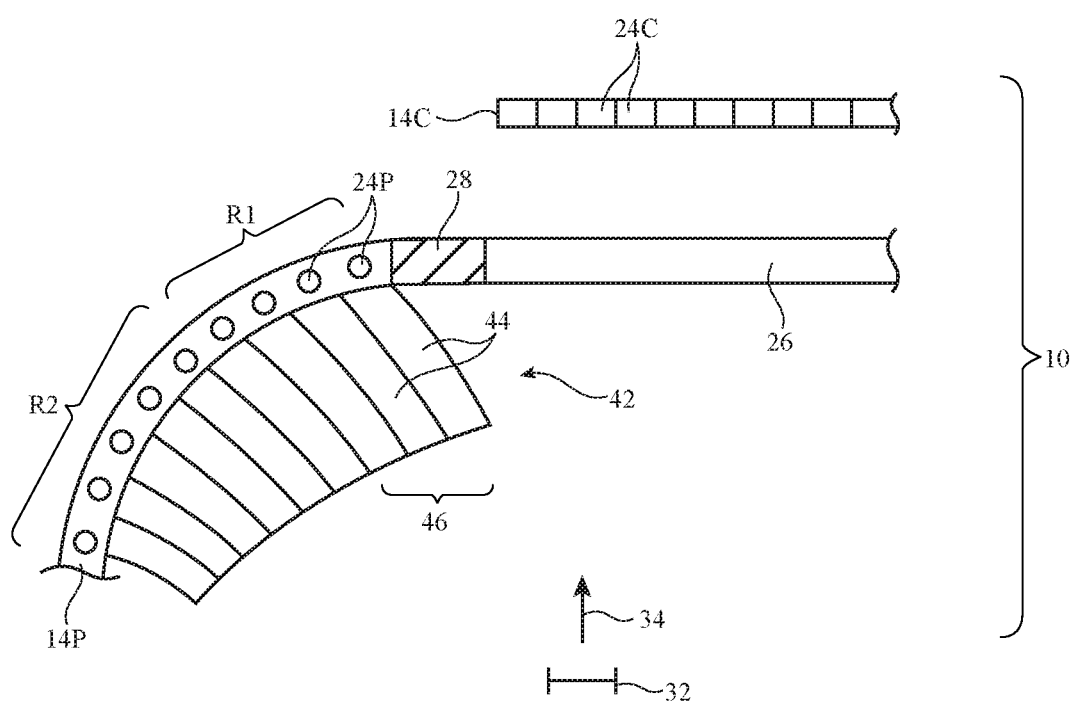
FIG. 4 is a cross-sectional top view of a portion of an illustrative head-mounted device in accordance with an embodiment.

To help block lens holder 28 from view, light guiding structures may be used to route light from pixels 24P in front of lens holder 28. Consider, as an example, the arrangement of FIG. 4. In the illustrative configuration of FIG. 4, device 10 has a peripheral display portion 14P with pixels 24P that are adjacent to lens holder 28. Lens holder 28 may be formed from opaque polymer or other material that does not pass light. To help block lens holder 28 from view, light guiding layer 42 may be placed in front of lens holder 28. Light guiding layer 42 may, for example, be a coherent fiber bundle layer having multiple parallel fibers 44. The ends of fibers 44 that are adjacent to pixels 24P receive light from pixels 24P and the opposing ends of fibers 44 provide corresponding output light to eye box 32 for viewing by a user. Fibers 44 may be provided with bends and/or the surfaces of layer 42 may have curved profiles to help guide light into desired location. In the illustrative configuration of FIG. 4, portion 46 of layer 42 overlaps lens holder 28 and thereby blocks lens holder 28 from view by a user's eye in eye box 32 (e.g., when the user is viewing display 14 in direction 34). The arrangement of FIG. 4 thereby helps visually hide the interface (seam) between the innermost edge of peripheral display 14P and the adjacent outermost edge of central display 14C.

If desired, peripheral display 14P may have pixels that are arranged with different densities in different locations. For example, pixels 24P that are near to central display 14C such as first pixels R1 may have a higher resolution (more pixels per inch) than pixels 24P that are farther from central display 14 such as second pixels R2. The density (number of pixels per unit area) of pixels 14P may vary smoothly and continuously or may contain locations in which pixel density varies discontinuously. As one example, pixels 14P in region R1 of peripheral display 14P may have a first density and pixels 14P in region R2 of peripheral display 14 may have a second density that is lower than the first density.

Arrangements in which pixels 14P exhibit a continuously decreasing density at increasing distances from the edge of central display 14C, arrangements in which pixels 14P have a constant density throughout display 14P, or other pixel density arrangements may also be used. If desired, density gradient effects can be implemented by rendering content on the portion of display 14P that is closest to display 14C with a higher resolution than content on the portion of display 14P that is farthest from display 14C (e.g., even in arrangements in which display 14P has pixels 24P of constant density). Rendering-based resolution gradients such as these may also be used in peripheral displays with pixel density gradients.

Figure 5:
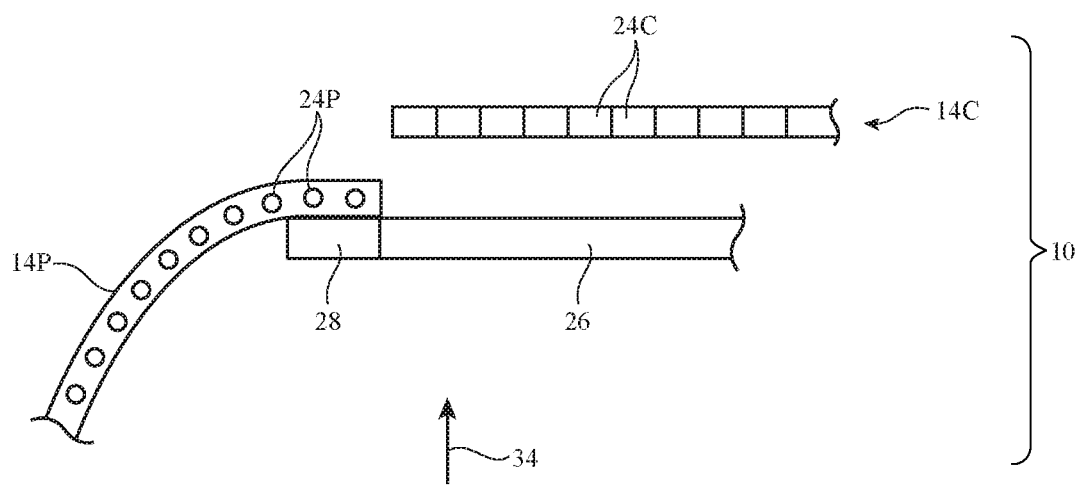
FIG. 5 is a cross-sectional top view of a portion of an illustrative head-mounted device having a light-diffusing lens holding structure in accordance with an embodiment.

If desired, lens holder 28 may be formed from a light-diffusing material, as shown in FIG. 5. Lens holder 28 of FIG. 5 may, for example, be formed from polymer with embedded light-scattering particles. The light-scattering particles may be formed from inorganic material such as titanium oxide or other metal oxide that has a different (e.g., higher) refractive index than the polymer in which the light-scattering particles is embedded. The polymer and light-scattering particles may be transparent to visible light. Lens holder 28 in this type of arrangement may overlap pixels 24P along the edge of peripheral display 14P as shown in FIG. 5. During operation, light emitted by the overlapped pixels 24P in display 14P is diffused when passing through the light diffuser formed from lens holder 28. This diffusing arrangement helps visually obscure the interface (seam) between peripheral display 14P and central display 14C (e.g., when a viewer is viewing display 14 in direction 34).

Figure 6:
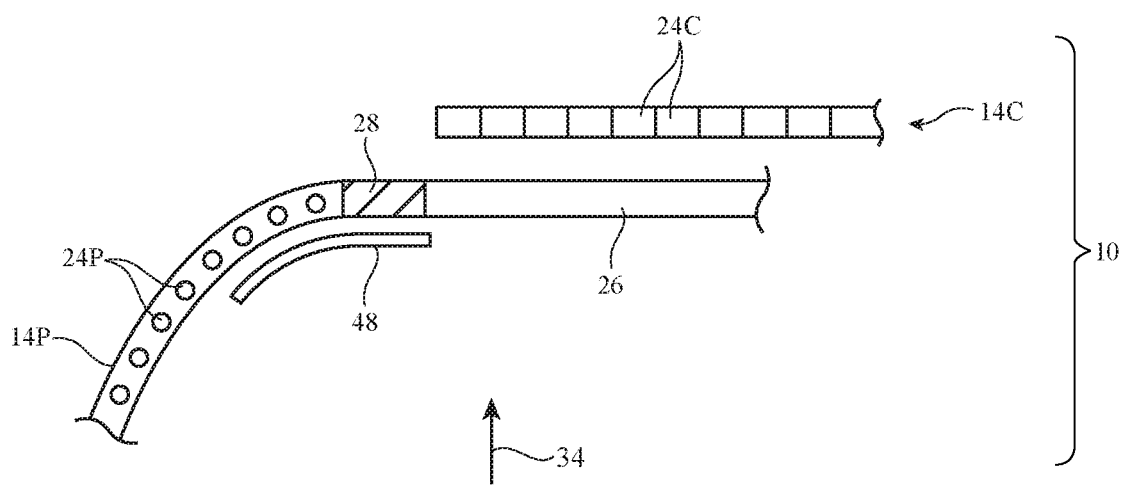
FIG. 6 is a cross-sectional top view of a portion of an illustrative head-mounted device with a diffuser in accordance with an embodiment.

In the illustrative configuration of FIG. 6, a separate diffuser (light diffuser 48) overlaps pixels 24P along the edge of display 14P to help visually obscure the interface between peripheral display 14P and central display 14C (e.g., when a viewer is viewing display 14 in direction 34). Pixels 24P may be formed adjacent to lens holder 28 or some of pixels 24P may be interposed between lens holder 28 and diffuser 48 (e.g., so that some of pixels 24P overlap lens holder 28). Light diffuser 48 may be formed from clear polymer with embedded light-scattering particles. Light diffuser 48 may be provided in the form of a sheet of light diffuser material, as a coating on a portion of display 14P, as a molded polymer member, and/or as any other suitable light diffuser structure. Combinations of the arrangements shown in FIGS. 4, 5, and/or 6 may also be used to help cover the interface between peripheral display 14P and central display 14C, if desired.

The interface between display 14C and peripheral display 14P may be made less noticeable by matching the brightness (luminance) and color (e.g., color coordinates) of the content being displayed on peripheral display 14P to the content being displayed on display 14C (or at least the content being displayed on the left and right edges of display 14C). If, for example, display 14C or a strip of pixels along an edge of display 14C is displaying dim orange content, display 14P may be adjusted to display matching dim orange content. This approach helps make the image on display 14 appear seamless and continuous.

The content of displays 14P and 14C may not be located at equal optical distances from eye boxes 34, which gives rise to a potential for parallax effects as a user's eyes move and point in different directions. For example, content on main display 14C may be presented in a focal plane that is far from the user (e.g., a distance of about 20 cm to infinity), whereas content on peripheral display 14P, which is not generally affected by an intervening lens such as lens 26, has a much smaller optical distance (e.g., a few centimeters). Display 14P therefore displays content at an optical distance that is less than the content displayed on display 14C. This can result in a parallax-induced mismatch between content on displays 14P and 14C.

Figure 7:
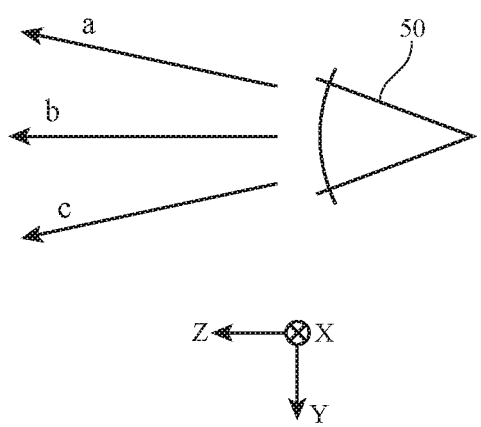
FIG. 7 is a side view of an illustrative eye showing different possible gaze directions that may be measured with a gaze tracking system in accordance with an embodiment.

A side view of an illustrative eye is shown in FIG. 7. As shown in FIG. 7, a user's eye may point in different directions at different times. For example, eye 50 may point horizontally (user gaze direction b), may point upwards (user gaze direction a), or may point downwards (user gaze direction c). Different gaze directions (e.g., gaze directions with different elevation angles as shown in the example of FIG. 7 and/or gaze directions with different azimuth angles) can lead to parallax due to the different optical distances of displays 14P and 14C. During use of device 10, display content on display 14 may be adjusted dynamically so that movement of the user's eye (e.g., movement from a first orientation in which the user is viewing display 14 in gaze direction a to a second orientation in which the user is viewing display 14 in gaze direction c) does not cause undesired visual artifacts on display 14.

Figure 8:
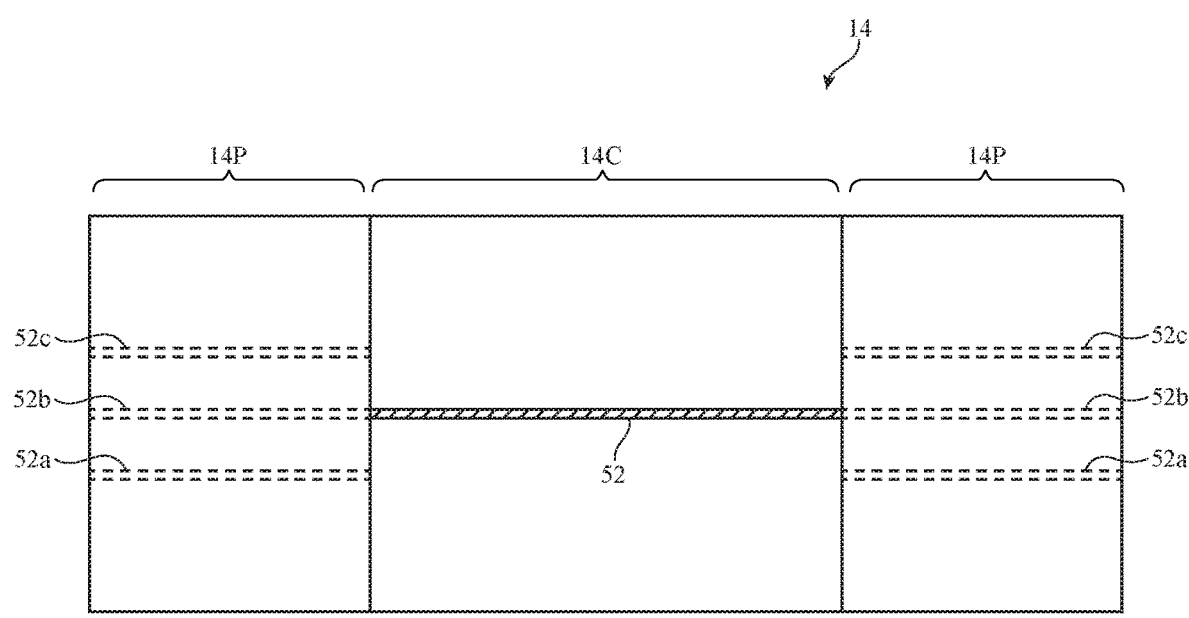
FIG. 8 is a front view of an illustrative display showing how content on the display may be susceptible to parallax effects depending on the direction of gaze of a user in accordance with an embodiment.

Consider, as an example, illustrative content such as horizontal line 52 that is being displayed on display 14 of FIG. 8. When the user is viewing display 14 with gaze direction b, parallax will not be present and line 52 on central display 14C will appear continuous across all of display 14. In particular, peripheral portion 52b of line 52 on peripheral display 14P will be correctly aligned with line 52 on central display 14C.

If, however, the user gazes downward, parallax effects will cause peripheral line portion 52c on peripheral display 14P to appear offset upwards with respect to line 52 on central display 14. Similarly, if the user gazes upwards, parallax effects will cause peripheral line portion 52a on peripheral display 14P to appear offset downwards with respect to line 52.

Figure 9:
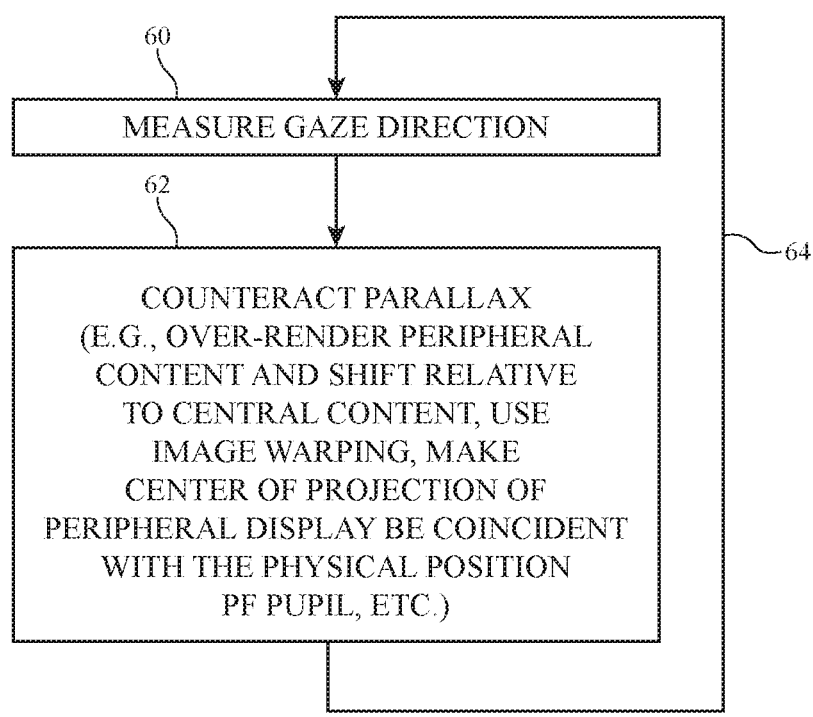
FIG. 9 is a flow chart of illustrative operations involved in compensating for parallax in accordance with an embodiment.

A flow chart of illustrative operations that may be used by control circuitry 12 of device 10 to compensate for these parallax effects and thereby ensure that display 14 presents content to the user without undesired visual artifacts is shown in FIG. 9.

During the operations of block 60, the gaze tracker (gaze tracking sensor) in sensors 18 is used by control circuitry 12 to gather information on the direction of gaze of the user's eyes.

During the operations of block 62, control circuitry 12 may present content on display 14 that has been adjusted based on the measured gaze direction to correct for parallax effects due to the different effective distances of the content on displays 14C and 14P from eye boxes 32. The operations of blocks 60 and 62 may be performed continually during use of device 10, as illustrated by line 64.

With one illustrative arrangement, control circuitry 12 over-renders the edges of the central content for display 14 during block 62. This edge content is displayed on display 14P adjacent to central display 14. While displaying the edge content on display 14P, the edge content is dynamically shifted up or down on display 14P based on the measured gaze direction of the user. The content on central display 14C is left unaltered. Consider, as an example, a scenario in which the user is looking in gaze direction c. In response to measuring that the user's direction of gaze is gaze direction c, control circuitry 12 shifts the edge content on display 14P downward relative to the content on display 14C (e.g., to align line portion 52c with line 52 on central portion 14C). Horizontal (azimuthal) parallax-induced mismatch may also be corrected in this way.

With another illustrative arrangement, control circuitry 12 stretches (warps) image content on peripheral display 14P to reduce parallax-induced mismatch between the content on display 14P and display 14C during the operations of block 62. For example, the portion of content on display 14P at which the user is looking (e.g., portion of the image closest to the eye's fixation point) may be shifted while the rest of the peripheral image is warped to make up for mismatch elsewhere in the image.

Another illustrative approach involves rendering content for peripheral portion 14P during block 62 so that the center of projection of the content on peripheral display 14P is coincident with the physical position of the user's pupil. This approach also compensates for differences in optical distance between peripheral display 14P and central display 14C.

Figure 10:
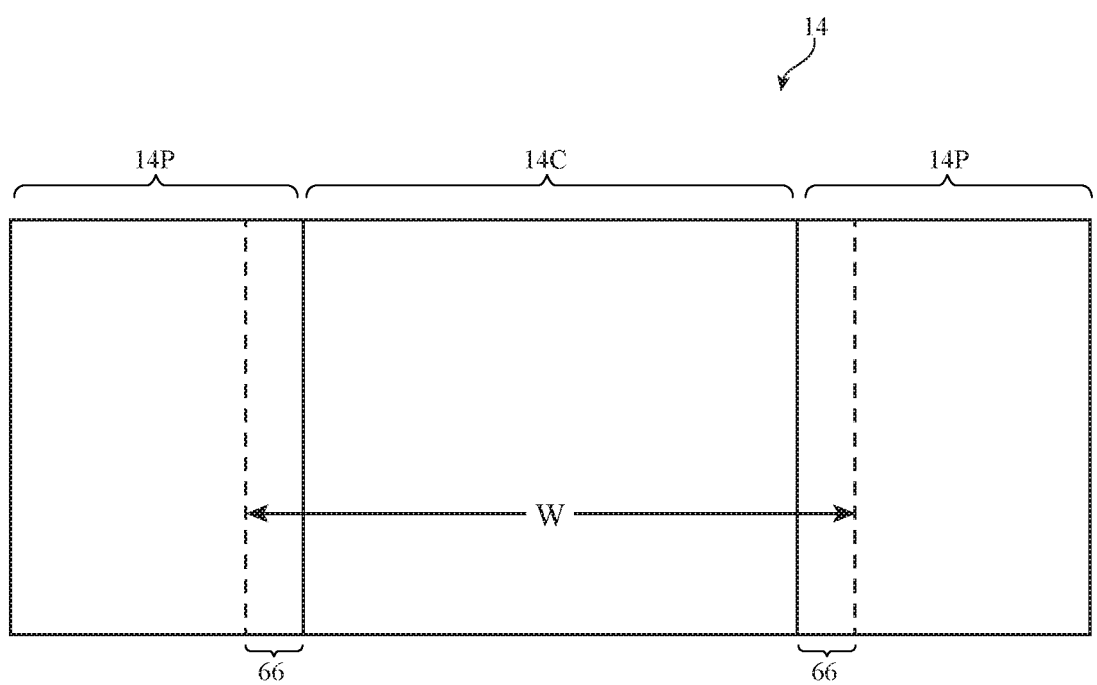
FIG. 10 is a front view of an illustrative display showing regions with content that may be expanded over peripheral display portions to hide interfaces between central and peripheral display portions in accordance with an embodiment.

The content on peripheral display 14P may include moving objects, solid colors, and/or other content. If desired, the content that is to be displayed on peripheral display 14P may be obtained by smearing out edge content from display 14C onto display 14P. This type of arrangement is shown in FIG. 10. As shown in FIG. 10, display 14 includes central display 14C and flanking lower-resolution display areas (peripheral display 14P). During operation of device 10, control circuitry 12 can render content corresponding to width W of display 14. The middle of this content may be displayed on central display 14C. The outermost left and right edges 66 of this content area may extend off the edges of central display 14C onto peripheral display 14P. To cover all of the surface area of peripheral display 14P, the content in edge portions 66 may be stretched laterally to cover all of peripheral display 14P rather than being confined to strip-shaped edge areas 66. If desired, parallax correction operations of the type described in connection with FIG. 9 can be performed on the content that is stretched out to cover display 14P to avoid parallax-induced mismatch between the stretched-out content and the content on display 14C.

If desired, the content on peripheral display 14P may be obtained from the content on display 14C using other approaches. As an example, the luminance and color of the content on peripheral display 14P may be determined from the average luminance and color of the content on central display 14C or may be determined from the average luminance and color of left and right edge portions of the content on central display 14C. Solid regions of color (e.g., solid regions with matching luminance and color), color gradients (e.g., color that fades to black or that reduces in saturation as the distance from display 14C increases), bands of color, and/or other patterns of peripheral content may be provided to fill peripheral display 14P. Display driver circuitry in display 14 (e.g., a timing controller integrated circuit(s)) may be shared between displays 14C and 14P. Configurations in which peripheral display 14P is driven separately from main display 14C and/or in which the content on display 14P is provided in a separate content stream may be used, if desired.

Although a user's peripheral vision has a lower spatial resolution than the center of the user's visual field, peripheral vision can be sensitive to light and motion. Accordingly, if an object is moving across the user's field of view, that object will be perceived on a peripheral display area before the object enters central display 14C. The inclusion of peripheral display 14P may therefore help provide a user with advance notice of objects entering the user's main field of view. The inclusion of content in peripheral display 14P can also avoid undesired tunnel vision effects in which a user perceives that the content on central display 14C (e.g., non-black content) is floating within an extended black region.

Figure 11:
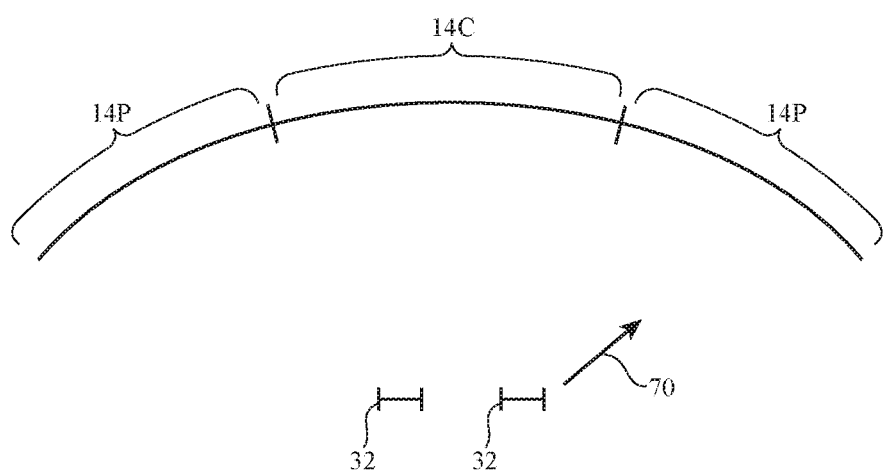
FIG. 11 is a top view of an illustrative display showing how pixels in the display may be selectively depowered or otherwise adjusted based on gaze direction in accordance with an embodiment.

To conserve power while operating display 14, unused pixels (e.g., unused pixels 24P in peripheral display 14) can be turned off when appropriate. For example, control circuitry 12 can use the gaze tracking system in sensors 18 to monitor the user's direction of gaze. When the user's gaze is directed more than a threshold amount (e.g., more than a threshold angle) away from the center of display 14, some of the peripheral pixels in display 14 will become unviewable by the user. As shown in the illustrative top view of device 10 of FIG. 11, for example, a user's gaze may be directed in direction 70 to the right of display 14. When the user's direction of gaze is angled to the right in this way, pixels 24P in the left-hand portion of peripheral display 14P will be unviewable to the user. Because the left-hand pixels 24P are invisible to the user (in this example), these pixels may be temporarily powered down (e.g., these pixels may be turned off) to conserve power. Right hand pixels 24P can similarly be powered down to conserve power in response to determining that the user's direction of gaze is oriented towards the left of display 14 (e.g., a direction in which the right-hand pixels 24P are not visible in the user's peripheral vision). All of the peripheral pixels 24P on the unviewable side of display 14 or just the outermost (least viewable) peripheral pixels 24P may be powered down. Configurations in which power consumption is reduced by momentarily reducing pixel output luminance without fully turning off pixels 24P may also be used.

Illustrative configurations for forming pixels in display 14 are shown in FIGS. 12, 13, 14, and 15.

Figure 12:
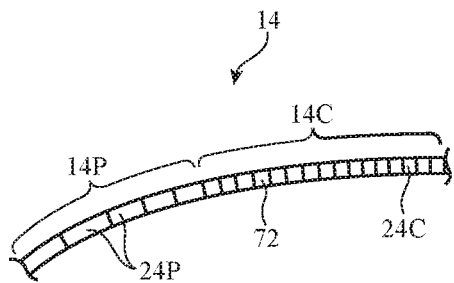
FIGS. 12, 13, 14, and 15 are illustrative display structures for a display in accordance with an embodiment.

Pixels 24C in central portion 12C may be organic light-emitting diode pixels, pixels with light-emitting diodes formed from crystalline semiconductor dies, liquid crystal display pixels (e.g., backlit pixels), microelectromechanical systems (MEMs) display pixels such as digital micromirror pixels, liquid-crystal-on silicon pixels, or other suitable pixels. In the illustrative configuration of FIG. 13, pixels 24C in central display 14C are formed on a substrate such as a flexible display substrate (e.g., an organic light-emitting diode display substrate). Pixels 24P in the example of FIG. 12 are formed on peripheral edge portions of the same flexible display substrate as pixels 24C. Pixels 24P may be, for example, organic light-emitting diode pixels formed from the same thin-film circuitry used in forming pixels 24C.

Figure 13:
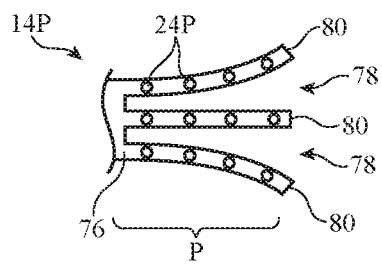

As shown in FIG. 13, pixels 24P may be formed on a flexible substrate layer 76. Substrate layer 76 may be, for example, a flexible sheet of polyimide or other flexible layer of polymer. If desired, substrate 76 may be formed from an elastomeric substrate material (e.g., silicone). Pixels 24P may be crystalline semiconductor dies forming respective light-emitting diodes. Substrate layer 76 may have a mesh shape (e.g., a shape with islands interconnected by stretchable serpentine segments) or may have other stretchable shapes. For example, substrate layer 76 may have fingers 80. Fingers 80 may be formed from elongated protrusions of substrate layer 76 that are separated by interposed slots 78. the elongated shapes of fingers 80 may allow fingers 80 to be mounted on a three-dimensional surface on the inside of support structure 22 (see, e.g., support structure 22 of FIG. 2). This surface may, for example, have a curved profile, may be a surface of compound curvature, etc.

Figure 14:
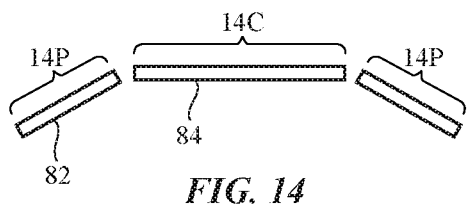

FIG. 14 shows how central display 14C and/or peripheral display 14P may be formed from rigid display panels (e.g., planar panels). Display 14C may be, for example, a flexible display or a rigid display formed from a rigid substrate. Display 14P may be, for example, a printed circuit board (e.g., a rigid printed circuit board formed from a rigid printed circuit board material such as fiberglass-filled epoxy) on which individual light-emitting diodes for pixels 24P have been mounted.

Figure 15:
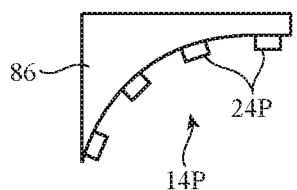

FIG. 15 shows how pixels 24P in peripheral portion 14P may be mounted on a molded polymer support structure or other support structure with a curved inner surface profile (support structure 86). Structure 86 may be, for example, a molded polymer support having an inner surface of compound curvature with patterned metal traces whereas pixels 24P on structure 86 may be microLEDs or other light-emitting diodes formed from crystalline semiconductor dies that are soldered to the metal traces.

The foregoing is merely illustrative and various modifications can be made to the described embodiments. The foregoing embodiments may be implemented individually or in any combination.

What is claimed is:

1. An electronic device, comprising:
   a head-mountable support structure;
   lenses supported by the head-mountable support structure;
   a display supported by the head-mountable support structure that has a central portion and a peripheral portion, wherein the central portion is configured to display central content that is viewable through the lenses from eye boxes and wherein the peripheral portion is configured to display peripheral content that is viewable from the eye boxes without viewing through the lenses;
   a gaze tracking system configured to monitor the eye boxes to gather gaze direction information; and
   control circuitry configured to adjust the peripheral content based on the gaze direction information.

2. The electronic device defined in claim 1 wherein the central portion has central pixels of a first density and wherein the peripheral portion has peripheral pixels of a second density that is lower than the first density.

3. The electronic device defined in claim 2 wherein the peripheral pixels are on a surface having compound surface curvature.

4. The electronic device defined in claim 2 wherein the peripheral pixels are formed on a flexible substrate having substrate portions separated by gaps.

5. The electronic device defined in claim 2 wherein the control circuitry is configured to adjust the peripheral content to correct for parallax-induced mismatch between the peripheral content and the central content.

6. The electronic device defined in claim 5 wherein the control circuitry is configured to adjust the peripheral content to correct for the parallax-induced mismatch by shifting the peripheral content relative to the central content based on the gaze direction information.

7. The electronic device defined in claim 5 wherein the control circuitry is configured to adjust the peripheral content to correct for the parallax-induced mismatch by warping the peripheral content relative to the central content based on the gaze direction information.

8. The electronic device defined in claim 5 wherein the control circuitry is configured to adjust the peripheral content to correct for the parallax-induced mismatch by rendering the peripheral content with a center of projection that is coincident with a physical pupil location.

9. The electronic device defined in claim 2 wherein the control circuitry is configured to selectively depower at least some of the peripheral pixels based on the gaze direction information.

10. The electronic device defined in claim 2 wherein the control circuitry is configured to produce the peripheral content from stretched over-rendered edge portions of the central content.

11. The electronic device defined in claim 2 wherein the control circuitry is configured to adjust the peripheral content to have a color and luminance that is matched to a portion of the central content.

12. An electronic device, comprising:
a head-mountable support structure;
left and right lenses supported by the head-mountable support structure and aligned with respective left and right eye boxes;
a display supported by the head-mountable support structure that has a central portion and a peripheral portion, wherein the central portion is operable to display central content that is viewable through the left and right lenses from the left and right eye boxes, respectively, wherein the peripheral portion is operable to display peripheral content that is viewable from the left and right eye boxes without viewing through the lenses, and wherein the peripheral portion has a left peripheral portion along a left edge of the central portion and a right peripheral portion along a right edge of the central portion;
a gaze tracking system operable to monitor the left and right eye boxes to gather gaze direction information; and
control circuitry operable to adjust the peripheral content based on the gaze direction information.

13. The electronic device defined in claim 12 wherein the central portion has central pixels of a first density, wherein the peripheral portion has peripheral pixels of a lower density than the central portion, and wherein the control circuitry is operable to adjust the peripheral content based on the gaze direction information to reduce parallax-induced mismatch between the peripheral content and the central content.

14. The electronic device defined in claim 12 further comprising light-diffusing lens holders for the left and right lenses, wherein light from some peripheral pixels in the peripheral portion passes through the light-diffusing lens holders.

15. The electronic device defined in claim 12 further comprising a neutral density filter that is between peripheral pixels in the peripheral portion and the left and right eye boxes.

16. The electronic device defined in claim 12 further comprising a light diffuser that overlaps at least some peripheral pixels in the peripheral portion.

17. An electronic device, comprising:
a head-mountable support structure;
a lens supported by the head-mountable support structure and aligned with an eye box;
a display supported by the head-mountable support structure that has a central portion viewable from the eye box through the lens and a peripheral portion viewable from the eye box without viewing through the lens, wherein the central portion has central pixels of a first density and wherein the peripheral portion has peripheral pixels of a second density that is less than the first density;
a gaze tracking system configured to monitor the eye box to gather gaze direction information; and
control circuitry configured to adjust the peripheral portion based on the gaze direction information.

18. The electronic device defined in claim 17 wherein the peripheral pixels comprise crystalline semiconductor light-emitting diode dies.

19. The electronic device defined in claim 18 wherein the peripheral pixels have a resolution of at least 10 pixels per inch and less than 50 pixels per inch.

20. The electronic device defined in claim 17 wherein the control circuitry is configured to depower some of the peripheral pixels in response to determining from the gaze direction information that those peripheral pixels are unviewable from the eye box.

21. An electronic device, comprising:
a head-mounted support structure;
a lens supported by the head-mounted support structure and aligned with an eye box; and
a display supported by the head-mounted support structure that has a central portion viewable from the eye box through the lens and a peripheral portion viewable from the eye box without viewing through the lens.

22. The electronic device defined in claim 21 wherein the central portion has central pixels of a first density and wherein the peripheral portion has peripheral pixels of a second density that is less than the first density.

23. The electronic device defined in claim 21 further comprising:
control circuitry configured to adjust peripheral content displayed on the peripheral portion to correct for parallax-induced mismatch between the peripheral content and central content displayed on the central portion.

* * * * *